Nov. 9, 1954

F. C. HOLTZ 2,693,991

WATT-HOUR METER COMPARATOR

Filed May 26, 1950

INVENTOR.
Frederick C. Holtz,
BY Brown, Jackson,
Boettcher + Dienner
attys

Nov. 9, 1954  F. C. HOLTZ  2,693,991
WATT-HOUR METER COMPARATOR
Filed May 26, 1950  3 Sheets-Sheet 2

| CT No | % LOAD | |
|---|---|---|
|  | 100 | 10 |
| C1 | O | C |
| C2 | C | O |
| C3 | O | C |
| C4 | O | C |
| C5 | C | O |
| C6 | C | O |
| C7 | C | O |
| C8 | O | C |

INVENTOR.
Frederick C. Holtz,
BY Brown, Jackson,
Boettcher & Dienner
ATTYS

Nov. 9, 1954  F. C. HOLTZ  2,693,991
WATT-HOUR METER COMPARATOR
Filed May 26, 1950  3 Sheets-Sheet 3
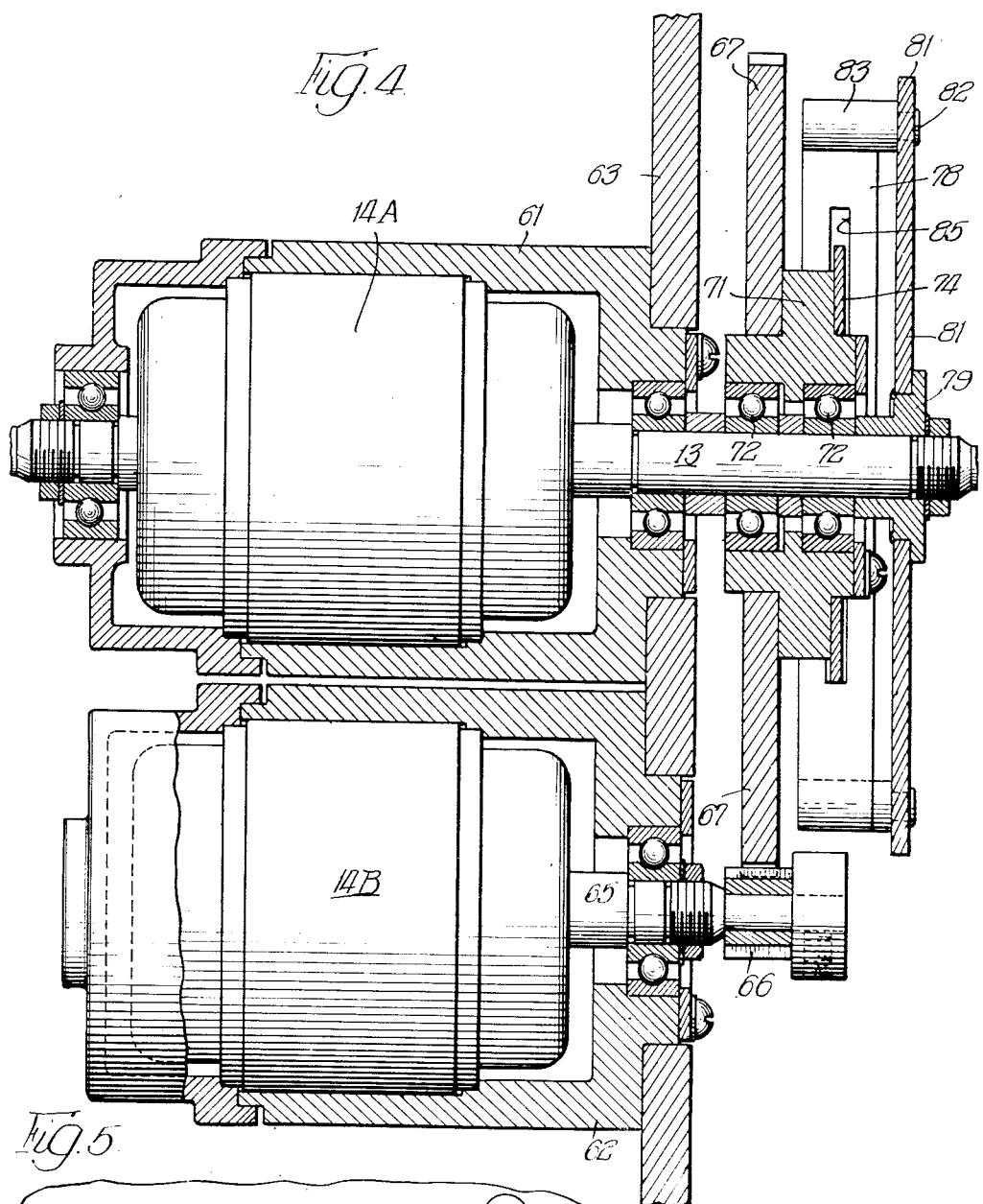
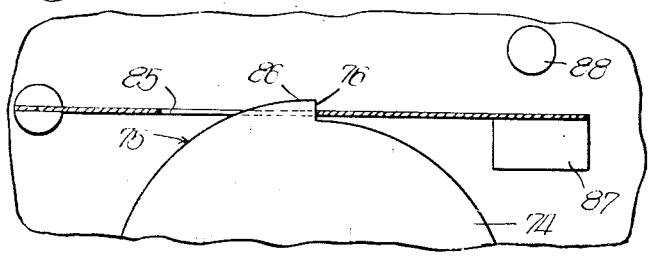
INVENTOR.
Frederick C. Holtz,
BY Brown, Jackson,
Boettcher & Dienner

United States Patent Office 2,693,991
Patented Nov. 9, 1954

2,693,991

WATT-HOUR METER COMPARATOR

Frederick C. Holtz, Springfield, Ill., assignor to Sangamo Electric Company, Springfield, Ill., a corporation of Illinois Application May 26, 1950, Serial No. 164,584

21 Claims. (Cl. 346—34)

The present invention relates, in general, to improved apparatus for recording the accuracy of a watthour meter or similar rotating system relatively to another meter or rotating system which may be referred to as a standard. Numerous methods are currently in use for determining the accuracy of integrating instruments, such as watt-hour meters, but all of these prior methods are subject to instrumental and human errors which apparently are inherent in such prior methods of measurement. A few of these prior methods will be referred to below for the purpose of indicating the nature of the errors which seem to be unavoidably inherent in such methods:

(1) *Testing by means of indicating instruments and time measurement*

Under this method the load is maintained as constant as possible while simultaneously measuring the time for the meter under test to make an integral number of revolutions. These times may be measured manually by means of a stop-watch or automatically by photo-electric means. The load is usually held by manual control and is subject to various types of human error.

(2) *Comparing rotation of meter under test with that of another which may be considered the reference standard*

In order to eliminate the human errors inherent in setting and holding loads, and also to simplify the testing, the rotation of the meter under test is frequently compared with that of another rotating meter which is called the standard. This may be done by starting both meters simultaneously from some fixed position and then comparing the integral and fractional turns at the end of some arbitrary period. This method involves starting and stopping errors and does not make the comparison over a period during which both the standard meter and the meter under test have been running under a steady state. To avoid this, it is frequently the practice to have the master meter generate light pulses through photoelectric or other means, by which the rotating element of the meter under test can be viewed stroboscopically. For example, Patent No. 1,904,124 to Cockrell describes such a method. While such method provides for comparing the rotation of two meters under continuous rotation, the determination of the accuracy of one meter with reference to a standard is still subject to observational errors. The accuracy depends upon the ability of an observer to determine the rate at which the meter under test is moving slower or faster than the reference standard. This involves the element of time, and hence is subject to errors of observation.

One of the objects of my invention is to eliminate as far as possible all human errors in the process of determining the relative accuracy of two meters under observation.

Another object of the invention is to provide a permanent record by means of which the relative accuracies may be determined, and which can be used for future reference.

Another object of the invention is to provide a more precise means of comparison whereby the relative accuracies may be checked from revolution to revolution, thus enabling the observer to follow the performance continuously and make appropriate adjustments when necessary.

Another object of the invention is to provide an improved watthour meter comparator which will readily enable the meter under test to be tested under different load conditions, as for example, at full load, light load, etc.

Other objects, features and advantages of the invention will appear from the following detail description of several preferred embodiments thereof. In the accompanying drawings illustrating such embodiments:

Figure 4 is a longitudinal sectional view of another embodiment of dual-motor drive for the marking drum wherein the two motors are on separate axes and the light-load motor drives the marking drum through speed reducing gearing, such embodiment also including an improved centrifugally responsive ratchet or clutch for uncoupling the light-load motor when the full-load motor is functioning;

Figure 5 is a fragmentary detail view of the centrifugally responsive ratchet drive used in the embodiment of Figure 4.

Figure 1:
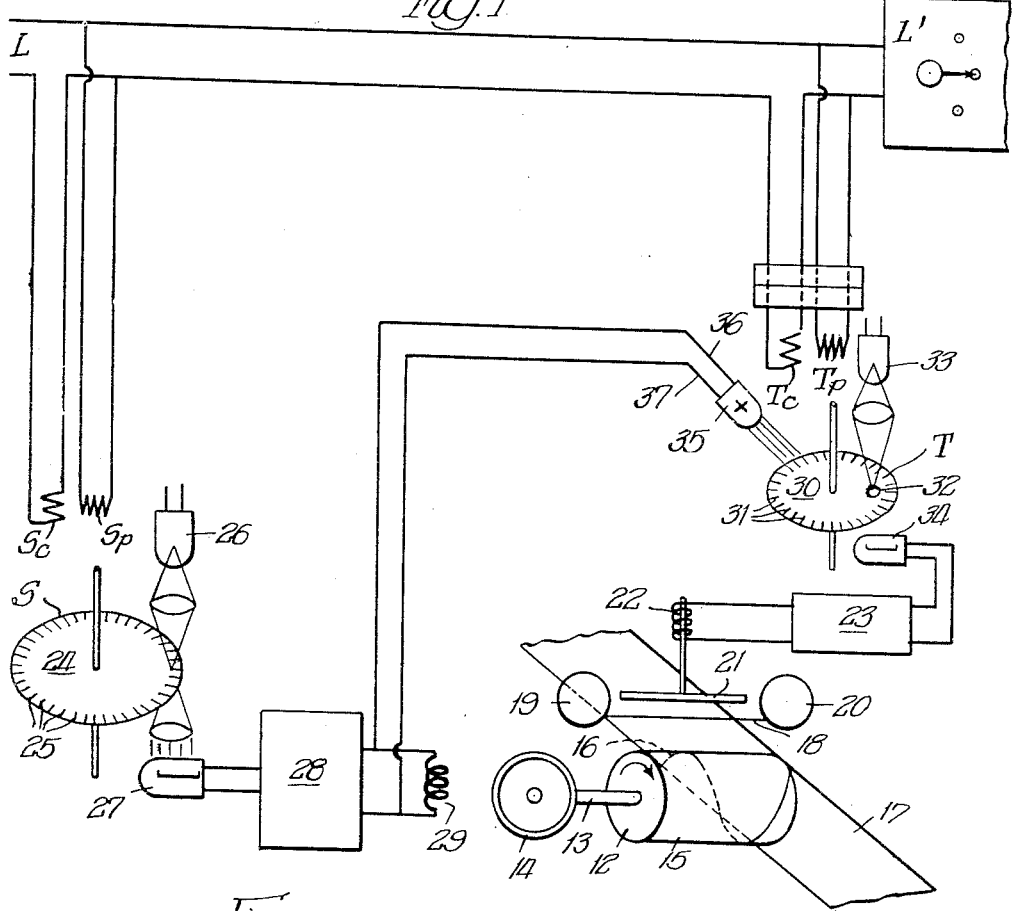
Figure 1 is a diagrammatic representation of the main elements in one of the more simple embodiments of the invention.

Referring first to Figure 1, the main recording elements of the apparatus are similar in some respects to the picture receiving apparatus disclosed in Patent No. 1,848,862 issued to Charles J. Young. These main recording elements comprise a cylinder 12 mounted on or driven by the shaft 13 of a synchronous motor indicated at 14. In the illustrated arrangement the cylinder 12 is operated at the same speed as the synchronous motor 14, but as I shall hereinafter describe, it may be advantageous to provide a selective speed drive for the cylinder 12, so that the cylinder can be operated at a satisfactory speed for the testing of meters at different load capacities, such as full load, light load, etc. The surface 15 of the cylinder 12 is smooth except for a spiral or helical ridge 16 of substantially triangular cross-section, the function of which will now be described.

Moving tangentially to, but out of contact with the cylinder 12, is a paper tape 17 which I prefer to drive by means of gearing to the synchronous motor shaft 13, which gear drive will be well understood to those skilled in the art. Situated adjacent to the paper strip 17 and parallel to the axis of the cylinder is a conventional typewriter ribbon 18 with its spools 19 and 20 driven by suitable means for the purpose of presenting a fresh ribbon surface to the paper strip 17 as often as necessary. A convenient arrangement for driving this ribbon 18 is by a reduction gear drive connecting to the shaft 13 of the synchronous motor 14.

Immediately above and in close proximity to the typewriter ribbon is a printing bar 21, whose flat surface lies parallel to the axis of the cylinder 12. In practice, the printing bar 21, ribbon 18 and paper strip 17 are almost in contact with each other along a line parallel to the shaft 13 and axis of the cylinder 12, with the paper strip 17 touching the outer surface of the cylinder 12. The printing bar 21 is arranged to be actuated by a suitable solenoid 22 which receives impulses from an amplifier 23. In this watthour meter comparator, the operation of the printing bar 21 is made to occur during a very short interval of time, in which interval it presses the ribbon 18 and paper strip 17 downwardly against the spiral ridge 16 on the cylinder 12, thereby making an imprint on the top side of the paper strip which defines the position of the spiral ridge 16 at that particular instant when the printing impulse occurred. Having described the main elements of the recording mechanism, I will now proceed to describe the manner in which the rotation of two watthour meters may be compared and recorded.

The watthour meter S illustrated at the left of Figure 1 represents generally an accurately calibrated standard or master meter of the conventional rotating disk type. The watthour meter T illustrated at the right in Figure 1 represents generally a meter to be tested, as by comparison with the standard meter S. The standard meter S and the meter being tested T are suitably connected with an electrical circuit or circuits, so that both meters operate at the same potential and both have the same or a common load. As illustrative of one typical arrangement, I have shown a single phase supply line L connecting with a load L' which is common to both meters. The potential coils Sp and Tp are connected in parallel across the line L, and the current coils Sc and Tc of the two meters are connected in series in this line. The load L' may be adjustable for testing full load performance, light load performance, etc. Suitable switches, plug-in connectors or the like are preferably provided so as to facilitate the connection and disconnection of successive meters T in the testing circuit. The connection of polyphase meters will be obvious to those skilled in the art.

Referring now to the manner in which the standard meter S drives the marking cylinder 12, it will be seen that the disk or rotating element 24 of this standard meter is provided with a series of equally spaced peripheral slots or apertures 25 which serve to intercept and pass a light beam arranged to be projected from a suitable light source 26 to a photo-electric cell 27 disposed on the other side of the disk. The photo-electric cell 27 is connected to a suitable power amplifier 28 which amplifies the pulses or signals and transmits them to the winding 29 of the synchronous motor 14. It will be seen that as the disk 24 of the standard meter S rotates, the slotted portion 25 of the disk will alternately pass and intercept the light beam from the light source 26, and through the action of the photocell 27 and amplifier 28 will deliver alternating current energy to the field 29 of the synchronous motor. Thus, the marking drum 12 is driven at a speed which is directly controlled by and in predetermined proportion to the speed of a standard meter S.

Referring now to the manner in which the meter undergoing test, designated T, is arranged to actuate the marking bar 21, this meter T also has its disk or rotating element 30 provided with a series of equally spaced peripheral markings or slots 31, corresponding substantially to the peripheral slots 25 in the disk of the standard meter S. The slots or markings 31 in the disk of the meter T function in a stroboscopic testing operation, as will be later described. In most instances, the elements 31 will be small, radially extending markings on the surface of the disk 30, although in some instances they might be slots or small apertures. In addition to these peripheral markings 31, the disk 30 is further provided with one or more small light-controlling apertures 32, which may be circular or of any other convenient shape. In most instances, meter disks are provided with two equally spaced openings, known as anti-creep holes, which may be used as such light-controlling apertures 32. A light source 33 provided with a suitable optical system is disposed to one side of the disk 30, so as to project a conical beam of light against the surface of the disk in the rotating path of the aperture or apertures 32. A photo-electric cell 34 is located on the opposite side of the disk 30 in a position such that its activated surface will be illuminated by the light from the source 33 only when the aperture or apertures 32 permit the light beam to pass through the disk. The apparatus can be adapted to the testing of meters having different numbers of these light-controlling apertures 32 in their disks 30, as by appropriate adjustment of the normal operating ratio between drum speed and actuating frequency of the printing bar; but in the following description I shall assume that there is only one of these apertures 32 in the meter disk 30. If desired, combs may be disposed above and below one or both meter disks 24 and 30 having appropriately shaped openings therein for coacting with the apertures 25 or 32 in such manner as to cause the light to pass through the disk apertures in parallel rays, for more uniform or more complete light interruption. The photo-electric cell 34 which responds to light passing through the aperture 32 is electrically connected to a suitable amplifier and trigger circuit indicated by the block diagram 23, the latter being so designed that on the first entry of light into the photo-electric cell 34 a charged condenser or other suitable source of electrical energy is discharged through the operating solenoid 22 of the printing bar 21. Such arrangement of amplifier and trigger circuit is well known to those skilled in the art. The discharges therefrom are of very short duration when compared to the time of rotation of the cylinder or drum 12. Consequently, the arrival of the aperture 32 at its predetermined position established by the light source and optical system 33—34 will be marked with reference to the simultaneous position of the spiral rib 16 on the cylinder 12 by the appearance of the dot $d$ on the paper tape 17. It will be seen that with a uniform rotation of the cylinder 12 in a clockwise direction, as indicated by the arrow, the contact position between the spiral 16 and the printing bar 20 will progress uniformly from left to right across the cylinder, and may occur at any point of a length which is the axial length of one complete revolution of the spiral 16.

In order to avoid any possibility of an erroneous reading of the printed record which might arise by reason of the meter T running at speeds which are multiples of the drum revolutions, I provide an auxiliary light source in the form of a stroboscopic lamp 35 which is energized at a frequency controlled by the standard meter S and which is arranged to cooperate stroboscopically with the peripheral markings 31 on the disk of the meter T. This stroboscopic lamp 35 is arranged to be energized by the amplifier 28 over lines 36 and 37, so that it has an illuminated frequency which is fixed or predetermined by the standard meter S, and particularly by the peripheral slots 25 in the disk of this meter. This stroboscopic light impinges upon the peripheral markings 31 of the disk of meter T, from which it is possible to obtain a relatively rough check of the relative speeds of the two meter disks, as for example in the manner described in Patent No. 1,904,124 to Cockrell.

The theory of my improved watthour meter comparator can now be best understood from the following mathematical treatment in which:

$K_s$=watthour constant of the standard meter S and meter-under-test T expressed in watt-seconds per revolution.

$W$=load in watts on the standard meter and the meter under test.

$N_0$=speed of standard meter in revolutions per second.
$n_0$=revolutions of the standard meter during some time interval $t$.

$N$=number of slots 25 in the disk of the standard meter S.

$P$=number of pole pairs on the stator of the synchronous motor 14.

$f$=frequency generated by the photocell 27 and amplifier 28 which supplies energy to the synchronous motor winding 29.

$N_1$=speed of the synchronous motor armature 14 and drum 12.

$n_1$=revolutions of the synchronous motor during some time interval $t$.

$S_0$=axial length or pitch of the spiral 16.
$S$=distance between successive dots $d$ as measured along the axis of the cylinder 12.

The speed of rotation of the standard meter S in R. P. S. will be $$N_0 = \frac{W}{Ks}$$

The frequency of the alternating current delivered to the synchronous motor field 29 will be $$f = \frac{W \times N}{Ks}$$

The speed of the synchronous motor and drum 12 will be $$N_1 = \frac{f}{P} = \frac{W}{Ks} \times \frac{N}{P} = N_0 \frac{N}{P}$$

It will be seen from the above that the speed of the synchronous motor 14 will be greater than that of the standard meter S in the ratio N/P. The relative motion and position of the disk 24 at any moment is therefore greatly amplified through the action of the peripheral slots 25 when translated into a rotation of the synchronous motor 14 and drum 12. This relative motion is then translated into a motion of the spiral 16 along the face of the printing bar 21. Suppose now that while meter element 30 makes one revolution which results in printing two successive dots $d$ on the tape, the synchronous motor 14 makes N/P revolutions, plus an additional fraction of a revolution $$\frac{S}{S_0}$$

where $S$ is the distance between dots $d$ measured along a direction parallel to the axis of the cylinder 12, and $S_0$ is the pitch of the spiral 16 in the same units. If we denote $$\frac{S}{S_0}$$

as $\alpha$ then this becomes merely the fraction of a revolution by which the motor has exceeded N/P revolutions. The synchronous motor therefore makes $$n_1 = \frac{N}{P} + \alpha$$

revolutions.
The standard meter has therefore made $$n_0 = \left(\frac{N}{P} + \alpha\right)\frac{P}{N} = 1 + \frac{\alpha P}{N}$$

revolutions.
It is customary to express the error of a meter under test in percent in respect to another of the same rating, taken as a standard by the formula $$E = \frac{n_t - n_s}{n_s} \times 100$$

where $n_t$ = number of revolutions of the meter under test in a given time interval, T.
$n_s$ = number of revolutions of the standard meter in the same time interval.

Hence, if the meter under test makes one revolution and the standard $$1 + \alpha\frac{P}{N}$$

the error in percent will be $$E = -100\frac{\frac{\alpha P}{N}}{1 + \frac{\alpha P}{N}}$$

Since $$\frac{\alpha P}{N}$$

is generally a small $x$ quantity in comparison to unity, we can write without appreciable error $$E = -100\frac{\alpha P}{N}$$

where $\alpha$ is to be taken as plus if the succession of dots move to the right as seen in Figure 1 and minus, if to the left. If we assume N=200 and P=2, then the error becomes, $E = -\alpha$.

Under these conditions it would be desirable to provide the chart 17 with 11 equally spaced lines running parallel to the direction of the chart and exactly spanning the pitch of the spiral 16. One space would then represent $\frac{1}{10}\%$ between the successive dots $d$. If, instead of letting $\alpha$ represent fractional revolutions by which the drum exceeds N/P revolutions per revolution of the disk 30, we put $\alpha = n + \alpha'$ where $n$ is some integral number of revolutions and $\alpha'$ is the fractional part, the error of the meter under test would be $$E = -100(n + \alpha')\frac{P}{N}$$

and using the same value of P and N as before $$E = -100(n + \alpha')$$

in per cent, approximately.

This indicates that the record will not disclose the possibility of errors which are multiples of drum revolutions. In that event, a two step process is required for bringing the meter into calibration. For that purpose, I have provided the previously described auxiliary light source in the form of the stroboscopic lamp 35 which is energized by the amplifier 28 over lines 36 and 37. The disk 30 is supplied with the same number of equally spaced markings 31 as there are slots 25 in the disk of the standard meter S, from which it is possible to check the relative rotations of the two disks, as previously described. By this means the adjustments of meter T are altered until it is within a range of accuracy such that only fractions of a revolution of the drum 12 need be recorded. Further adjustment is then made until the space between successive dots $d$ falls within the desired limits.

Figure 2:
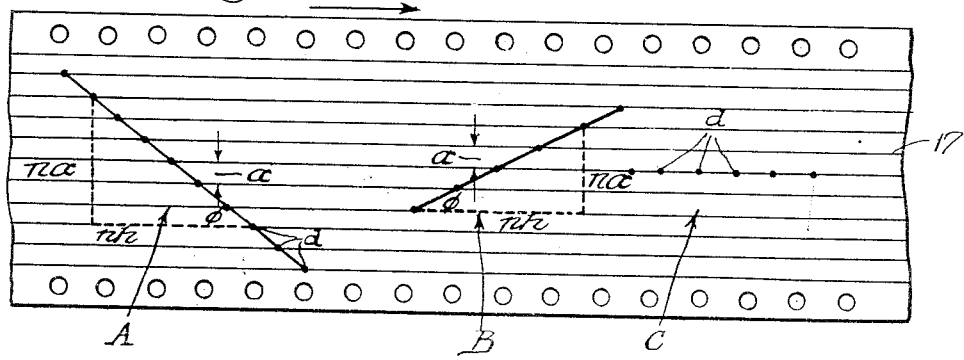
Figure 2 is a fragmentary elevational view of the portion of the paper record tape resulting from the testing operation, showing the type of permanent record which is obtained from my improved comparator.

If the chart 17 is being driven forward through suitable gearing from the shaft 13 the pattern found by a succession of dots will generally fall along a straight line which makes a definite angle $\phi$, with the lines parallel to the edge of the chart, as shown in Figure 2. If we let $\alpha$, as before, equal the distance across the chart between successive dots, as a fraction of the pitch of the spiral, then the horizontal distance must be $$h = K\left(\frac{N}{P} + \alpha\right)$$

where K is a constant which depends only upon the gear ratio and diameter of the drum which moves the chart.
We then have $$\tan \phi = \frac{\alpha}{h} = \frac{\alpha}{K\left(\frac{N}{P} + \alpha\right)}$$

now $\alpha$ is usually small in comparison with N/P so that we may write $$\tan \phi = \frac{\alpha P}{KN}$$

As a practical example, let us choose K in such a manner that $\phi = 45°$ when $\alpha = 0.1$; we then have $$K = \frac{\alpha P}{N \tan \phi} = 0.1\frac{P}{N}$$

If, as before, P=2 and N=200, K=.001 and the dots form a line making angles of 45° with the horizontal lines. From Figure 1, it will be seen that if the rotation of the drum is in a clockwise direction, the meter under test will be indicated as slow when the slope of the dots is similar to the line of dots shown at A in Figure 2, whereas the meter will be indicated as fast when the slope of the dots is similar to the line of dots B. The meter is indicated as correct when the line of dots has no diagonal slope, but extends longitudinally of the paper tape, as indicated at C in Figure 2.

That the choice of N/P should be an integral number is evident from the following consideration. If we suppose that $$\frac{N}{P} = U + \frac{r}{p}$$

when U is an integer and $$\frac{r}{p}$$

is, say, the fractional excess, then this fractional excess is constantly being added to $\alpha$ and two or more lines may appear on the tape depending on the value of $$\frac{r}{P}$$

If we assume N/P reduced to its lowest terms, we can say that pattern will repeat itself every P revolutions of the master meter and there will be P lines discernable on the tape.

For example, if N=20 and P=3, the pattern will repeat itself every third revolution of the master meter and there will be three sets of lines discernable on the tape. In this case, the proper choice of N would be 180 and, hence, $$\frac{N}{P} = \frac{60}{1}$$

when the pattern would repeat itself every revolution of the master meter and there would be only one line discernable on the tape.

I shall now describe the procedure of comparing meters at speeds considerably below what might be called full load rating. This procedure presents no problem at such points as full load 0.5 pf. where the speed is one-half normal full load speed. The amplifying system and synchronous motor 14 are so designed as to maintain proper conditions for satisfactory recording at such time, in which event the scale of the chart on the paper tape 17 and its interpretation may remain unchanged.

However, it may be desirable to check the accuracy of the meter-under-test T at much lighter loads, as for example a load 10% of normal. At this point, the frequency developed by the standard meter S may be too low to insure stable operation of the amplifying system 28 and the synchronous motor 14. One possible method of overcoming this objection would be to equip the standard meter S with additional energizing coils, so that it would run at normal full load speed, even though it was only energized with a load 10% of normal. In the absence of any change in the synchronous motor 14 and its driving connection with the marking drum 12, this would automatically change the scale of the chart 17 such that 1% on the previous chart would now be only 1/10%. However, this greater sensitivity might be far in excess of any requirements. Accordingly, I have devised other modifications or arrangements which will avoid this difficulty and still enable the meter T to be tested under light loads, such as 10% of normal. One modified construction for accommodating light load testing employs two synchronous motors on the shaft 13 for driving the marking drum 12, one of these synchronous motors having a stator providing with P pairs of poles, and the other motor having a stator provided with 10P pairs of poles.

Another modified construction for accommodating light load testing employs two synchronous motors for driving the shaft 13, one of which motors is directly coupled to the shaft and the other of which motors is adapted to drive the shaft through an arrangement of speed reducing gearing.

Figure 3:
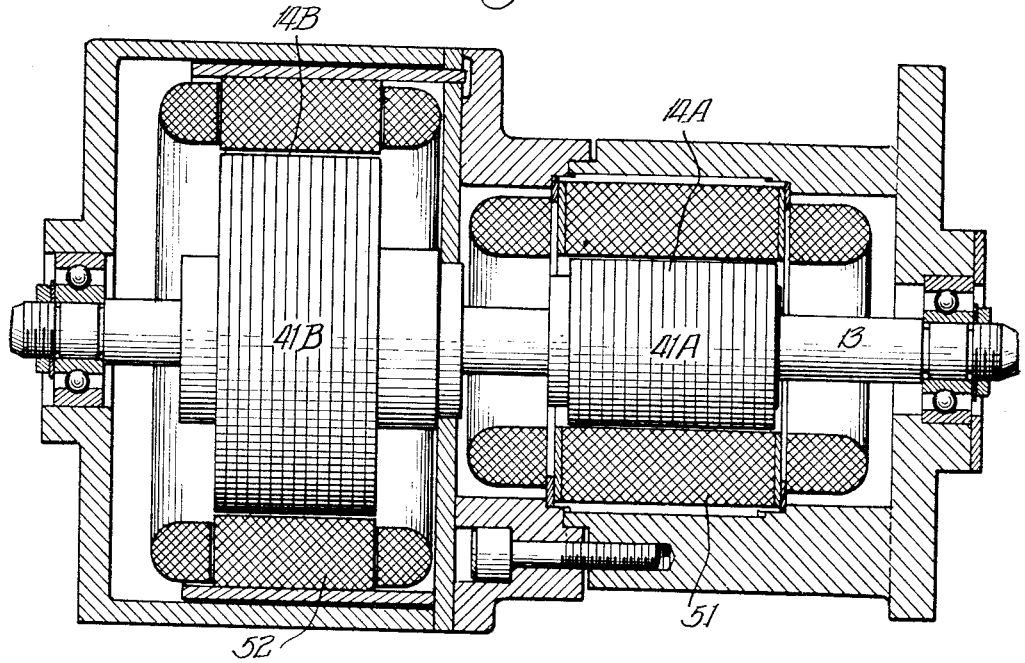
Figure 3 is a longitudinal sectional view of a dual-motor drive for the marking drum, one motor driving the drum during full-load testing and the other motor driving the drum during light-load testing, both motors being coaxially mounted in this embodiment, and the light-load motor having a large number of poles.

In Figure 3 I have illustrated the first of these modified constructions, namely, the construction employing two synchronous motors both directly coupled to the drive shaft 3, but one provided with a stator having 10P pairs of poles. The first of these motors is indicated generally at 14A, this being the full load motor, and the second of these motors is indicated generally at 14B, this being the light load motor, both of these motors having their rotors mounted coaxially upon the main motor shaft 13. The stator of the motor 14A is constructed with P pairs of poles, and if the light load testing is to be performed at 10% normal load, then the stator of the second motor 14B has 10P pairs of poles. That is to say, if the stator of motor 14A has two poles, then the stator of motor 14B has twenty poles. Preferably, these motors are of the self-starting synchronous type having hysteresis rotors. The stator winding 51 of motor 14A is energized when a full load test is being made, and the stator winding 52 of the second motor 14B is energized when the 10% normal load test is being made.

In Figures 4 and 5, I have illustrated the other modified construction also utilizing the full load motor 14A and the light load motor 14B, but with the light load motor 14B connected with the drive shaft 13 through a speed reducing gear train. This avoids the necessity of constructing the light load motor with such a large number of stator poles, as is true of the light load motor 14B in Figure 3. In the embodiment of Figures 4 and 5, the full load motor 14A and the light load motor 14B can both be practically the same size and type, the stator frames 61 and 62 of these two motors being preferably mounted side-by-side, as by suitable mounting at one end in a mounting plate 63. The rotor of the full load motor 14A is mounted directly on the drive shaft 13 which has operative connection with the marking drum 12 for driving the latter. The rotor of the light load motor 14B is mounted on a shaft 65 which carries a small spur pinion 66 at one end. This small pinion meshes with a large spur gear 67 which is mounted coaxially of the drive shaft 13. The ratio between the gears 66 and 67 is such as to give the 1 to 10 ratio of the motor 14B with respect to the motor 14A in driving the marking drum. I have provided a unique arrangement of centrifugally responsive ratchet or clutch operative between the drive shaft 13 and the large spur wheel 67, so that when the full load motor 14A is being energized for driving the marking drum it is not compelled to drive the light load motor 14B at ten times the normal speed of this light load motor. Referring to the details of this centrifugally responsive ratchet or clutch, it will be seen that the large spur wheel 67 is mounted on a hub 71 which is journalled for free rotation on the drive shaft 13 through a pair of spaced anti-friction bearings 72. Secured to a radial face of this hub 71 and projecting therefrom is a ring 74 having an outwardly spiralling cam surface 75 terminating in a radially extending driving shoulder 76 (Figure 5). Cooperating with this cam surface 75 and driving shoulder 76 is a centrifugally responsive ratchet spring or pawl 78 which is operatively connected with the drive shaft 13. To this end, a hub 79 is clamped or keyed fast to the drive shaft 13, and extending from this hub is a rotating mounting plate 81. Riveted in this plate 81 is a mounting pin 82 having an inwardly extending shank portion 83 which is slotted diametrically. The ratchet spring 78 is preferably in the form of a thin spring metal reed having one end fixedly anchored in the slotted shank portion 83 of the pin 82. Extending lengthwise in this spring reed is a slot 85 which embraces the radially projecting portion of the ratchet ring 74. The radially projecting driving shoulder 76 on this ratchet ring 74 is adapted to effect driving engagement against the end 86 of the slot 85 when the light load motor 14B is being energized for driving the marking drum through the speed reducing gear train 66 and 67. The free end of the ratchet spring 78 carries a weight 87 which tends to flex the ratchet spring outwardly to a de-clutching position with respect to the radially extending driving shoulder 76 when the drive shaft 13 comes up to normal full load speed in response to the energization of the full load motor 14A. A stop pin 88 projecting inwardly from the plate 81 serves to limit this outward flexing motion of the ratchet spring in response to centrifugal force acting on the weight 87. If desired, a duplicate rise 75 and drive shoulder 76 may be provided at the diametrically opposite side of the ratchet ring 74, and a duplicate ratchet spring 78 provided for engagement therewith. Referring now to the operation of this reduction gear embodiment, when the meter T is being tested under full load the full load motor 14A is being energized and is rotating the drive shaft 13 at a relatively high speed corresponding to full load rotation of the marking drum 12. The mounting plate 81 is of course rotating concurrently with the drive shaft 13, in the direction indicated by the arrow in Figure 5, and at this relatively high speed the weight 87 at the free end of the ratchet spring 78 responds centrifugally and flexes the spring outwardly. Hence, instead of the forward driving edge 86 of the slot 85 merely sliding over the peripheral cam slope 75 of the ratchet disk 74, this end of the slot is held entirely out of contact with the ratchet disk, so that the parts are completely separated and there is no chattering noise or vibration. In this centrifugally released over-running condition of the clutch or ratchet there is practically no torque being transmitted through the gear train 67—66 to the light load motor 14B, and hence this latter motor can stand substantially inert.

On the other hand, when the meter T is to be tested at light load, such as a 10% load, the light load motor 14B is energized and this transmits rotation through the gear train 66—67 and to the ratchet disk 74 and radial driving shoulder 76. This latter shoulder engages the driving shoulder 86 at the end of the slot 85 in the ratchet spring 78 and transmits relatively slow speed rotation to the drive shaft 13 through the ratchet spring 78 and mounting plate 81. This relatively slow speed rotation transmitted to the rotor of the full load motor 14A does not impose any objectionable torque burden upon the operation of the light load motor 14B. At this relatively slower speed, the centrifugal force acting on the weight 87 is insufficient to overcome the inwardly acting biasing force in the ratchet spring 78, and it remains latched against the radial driving shoulder 76.

It will be appreciated that if the speed of the marking drum 12 is decreased in proportion to the decrease in load on the meter T under test, while the standard meter S continues to operate under full load conditions, the scale on the paper tape chart 17 will remain fixed for all loads. Light load testing might therefore be indistinguishable from full load testing on this chart. To overcome this possibility of confusion, light load testing may be distinguished from full load testing by introducing a series of pulses into the triggering circuits which appear on the chart and can be readily identified.

Figure 6:
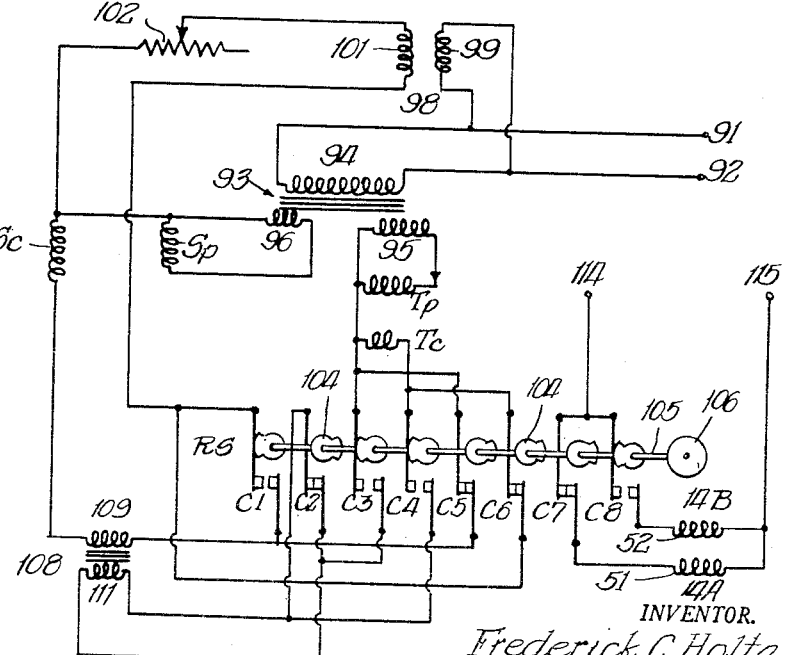
Figure 6 is a circuit diagram of a controller or change-over apparatus for quickly effecting the transition in the system from full-load testing to light-load testing, and vice versa.

In Figure 6, I have illustrated an arrangement of electrical connections for performing full load and light load testing operations employing the construction shown in Figure 3, and for performing full load and light load testing when employing the construction shown in Figures 4 and 5. This electrical hook-up of Figure 6 operates in accordance with what is generally known as a phantom load method of testing. Power at the proper voltage and frequency is supplied to the system over the supply lines 91 and 92. A transformer 93 is provided with a primary winding 94 which is connected to the supply lines 91 and 92. A secondary winding 95 of this transformer supplies the potential to the potential coil T$p$ of the meter under test, and another secondary winding 96 supplies the same potential to the potential coil S$p$ of the standard meter S.

A second transformer 98, known as a loading transformer, has its primary winding 99 connected to the supply circuit 91, 92. A secondary winding 101 of this transformer provides a relatively low voltage for exciting the current coil S$c$ of the standard meter S and the current coil T$c$ of the meter under test. A variable resistor 102 in this circuit permits adjusting the current to approximately correct value. The necessary arrangement of electrical connections is provided through the action of a rotary switch RS having a total of eight contacts C1–C8, each capable of being held open or closed by means of a series of cams 104 of insulating material mounted on a common shaft 105, to which is secured a hand wheel 106.

A current transformer 108 of correct ratio has its primary winding 109 connected in series with the current coil S$c$ of the standard meter S. Its secondary winding 111 has its terminals connected to the stationary contacts of the switch contact pairs C2, C3 and C4, as shown. The position of the cams shown in Figure 6 corresponds to a meter being tested at full load. In this position of the rotary switch RS, the secondary winding 111 of the current transformer 108 is short-circuited, and the current coil T$c$ of the meter T under test is in series with the current coil S$c$ of the standard meter S. Switch contacts C7 are closed, thereby permitting the power from the amplifier 28 of Figure 1 to flow by way of conductors 114 and 115 to the stator winding 51 of the full load motor 14A of either Figure 3 or Figure 4. Thus, in this position of the rotary switch the full load motor 14A is energized for rotating the marking drum at full load speed, and the light load motor 14B stands de-energized, this being true of either of the embodiments of Figures 3 or 4.

When the hand wheel 106 is rotated through a half revolution, the relative positions of the contacts C1–C8 is reversed; those previously open are now closed and vice versa, corresponding to a test at 10% load with the master meter S still operating at full load speed. Under these conditions, the current coil T$c$ of the meter T under test is connected to the secondary winding 111 of the current transformer 108. The closure of contacts C1 permits the current to be maintained in the current coil S$c$ of the standard meter S and in the primary winding 109 of the current transformer 108. With the opening of contacts C7 and the closure of contacts C8, the full load motor 14A becomes de-energized, and the amplifier 28 of Figure 1 becomes connected through conductors 114 and 115 with the stator winding 52 of the light load motor 14B of either Figure 3 or Figure 4. This provides for performing a light load test with the meter-under-test T operating at 1/10 full load speed.

My invention also contemplates still another arrangement for performing testing operations at full load and at light load (such as 1/10 full load speed). This further arrangement comprises the use of two recorders, one of which operates at full load speed, and the other of which drives the marking drum at light load speed (such as 10% load speed). One of these recorders would drive its drum at a speed corresponding to a motor with P pairs of poles. The other recorder would be geared down with suitable gearing somewhat comparable to that shown in Figure 4, but without any centrifugal ratchet or clutch mechanism, whereby the drum of that recorder would rotate at a speed corresponding to the speed of a motor with 10P pairs of poles. An electrical switch arrangement corresponding to that shown in Figure 6 could be used for effecting the operation of these two recorders. One particular advantage residing in the use of two recorders is that one meter may be undergoing test at full load on one recorder, and another meter may be undergoing test at light load on the other recorder, so that both recorders can be working simultaneously.

In each of the previously described embodiments, the two motors 14A and 14B might be of the polyphase type, as for example two-phase motors, and the amplifier or amplifiers 28 would then be provided with phase splitters for supplying such polyphase current to these motors. Such motors would have a self-starting characteristic, and would possess the other advantages inherent in polyphase motors.

Another modification embraced within my invention is the use of a multi-vibrator "flip-flop" system for successively reducing frequencies down to possibly as low as five cycles per second. In such arrangement, one motor would suffice, and this motor could be used for full load testing or light load testing by tapping off at the desired point of the multi-vibrator system.

Another modification of the invention contemplates the substitution of a synchronous motor driven light-chopper in lieu of the stroboscopic glow tube 35. In this modified arrangement, a synchronous electric motor would be arranged to drive a chopping disk or like element for breaking up a plain light beam landing on the markings 31 of the disk of meter T. The synchronized frequency of this interrupted light beam could be proportioned to give the same effect as the stroboscopic glow tube in the performance of the first testing operation for making sure that the disk 30 is not running at a higher speed which is a multiple with respect to the rotation of the marking drum 12.

My improved watthour meter comparator enables the meter manufacturer, or the public utility company, to send a chart along with each meter as proof of its calibration. Under proper supervision, such chart might very well be accepted by the Public Service Commissions as proof of test and adjustment.

A further advantage of my improved watthour meter comparator resides in the fact that an operator testing several meters at a time against a standard meter can devote as much attention as necessary to any individual meter without losing contact with other meters on the test, in view of the fact that it is only necessary to go back and look at the record in each instance.

While I have illustrated and described what I regard to be the preferred embodiments of my invention, and the preferred methods of carrying them into effect, nevertheless it will be understood that such are merely exemplary and that numerous modifications and rearrangements may be made therein without departing from the essence of the invention.

I claim:

1. In a watthour meter comparator for making comparison checks on conventional watthour meters of the type wherein the rotating meter disk is provided with a large number of calibrating marks around its periphery and is also provided with one or two anti-creep apertures spaced inwardly from its peripheral edge, the combination of a standard meter having its rotating disk provided with a large number of slots around its periphery, a source of light arranged to project a light beam through said slots, a photoelectric cell responding to the alternate transmission and interruption of said light beam, means for amplifying the output of said photoelectric cell, a synchronous motor driven by said amplified output, a drum driven by said synchronous motor, a raised spiral rib on said drum, a record tape arranged to travel across the surface of said drum, means for driving said record tape at a speed proportional to the speed of said drum, a printing bar actuatable toward said record tape and spiral rib to make a printed record on the tape corresponding to the position of said spiral rib at the instant of printing, and means for actuating said printing bar at a frequency determined by the rotative speed of the meter being checked, comprising a source of light arranged to project a light beam through the anti-creep hole or holes in the disk of such meter, a photoelectric cell responding to the alternate transmission and interruption of said latter light beam, means for amplifying the output of said latter photoelectric cell, and electromagnetic means responsive to said amplified output for actuating said printing bar, the relatively high frequency of the first electrical output created by the relatively large number of slots in the disk of the standard meter and the relatively low frequency of the second electrical output created by the one or two anti-creep holes in the disk of the meter being tested co-operating to establish a distributed linear sequence of marks on the record tape for immediately showing whether the meter being checked is accurate or tends to run fast or slow.

2. In a watthour meter comparator for making comparison tests on conventional watthour meters of the type wherein the rotating meter disk is provided with an anti-creep aperture spaced inwardly from its peripheral edge, the combination of a standard meter having a rotating disk provided with a large number of calibrating slots around its periphery, a source of light arranged to project a light beam through said slots, a photoelectric cell responding to the alternate transmission and interruption of said light beam, a synchronous motor arranged to be driven by the output of said photoelectric cell, a rotating drum driven by said synchronous motor, a raised spiral rib on said drum, a recording tape arranged to travel across the surface of said drum, a printing bar actuatable toward said recording tape and spiral rib to make a printed record on the tape corresponding to the position of said spiral rib at the instant of printing, a source of light arranged to project a light beam through the anti-creep hole in the disk of the meter being tested, a photoelectric cell responding to the alternate transmission and interruption of said latter light beam, electromagnetic means responsive to said latter photoelectric cell for actuating said printing bar, the relatively large number of calibrating slots in the disk of the standard meter producing a relatively high rotative speed of said drum, and the anti-creep hole in the disk of the meter being tested producing a relatively low actuating periodicity of the printing bar, and means for driving the recording tape at a speed proportioned to the relatively high rotative speed of the drum whereby to make a record on said tape in the form of a series of dots spaced linearly along the length of the tape and defining by the direction or slope of the line of dots whether the meter being tested is accurate or is running fast or slow.

3. In apparatus for comparing the rotative speed of a device to the rotative speed of a standard, the combination of a record medium, a rotating member carrying a marking projection through a predetermined path of travel relatively to said record medium, means responsive to the rotation of said standard for governing the rotation of said rotating member, a printing member adapted to be actuated toward said marking projection for making a printed impression on said record medium, means responsive to the rotative speed of said device for governing said printing member, and means for adjusting the speed of said rotating member relatively to the speed of said standard to enable said device to be checked for different rates of rotation.

4. In apparatus for comparing the rotative speed of a meter to the rotative speed of a standard, the combination of a record medium, a rotating member carrying a marking projection through a predetermined path of travel relatively to said record medium, means responsive to the rotative speed of said standard for governing the rotative speed of said rotating member, a printing member adapted to be actuated toward said marking projection for making a printed impression on said record medium, means responsive to the rotative speed of said meter for governing said printing member, and means for adjusting the rotative speed of said rotating member relatively to the speed of said standard to correspond to different loads at which it is desired to check the meter.

5. In a watthour meter comparator, the combination of a paper tape, a rotating drum carrying a marking projection which establishes a printing point that travels transversely of said paper tape on one side thereof, a printing bar on the opposite side of said paper tape adapted to be actuated toward said marking projection for coacting therewith in making a printed mark on said tape, a standard meter, means responsive to said standard meter for governing said rotating cylinder, and means responsive to the watthour meter to be checked for actuating said printing bar at a relatively low actuating periodicity not in excess of one or two printing impressions for each revolution of the disk of the meter being checked.

6. In a watthour meter comparator, the combination of a paper tape, a rotating drum carrying a marking projection which establishes a printing point that travels transversely of said paper tape on one side thereof, a printing bar on the opposite side of said paper tape adapted to be actuated toward said marking projection for coacting therewith in making a printed mark on said tape, a standard meter, means responsive to said standard meter for governing said rotating cylinder, means for projecting a light beam through an anti-creep hole in the disk of the meter being tested, means responsive to said light beam for governing said printing bar, and means for adjusting the rotative speed of said drum relatively to the rotative speed of said standard meter corresponding to different loads at which the watthour meter is to be checked.

7. In a watthour meter comparator, the combination of a paper tape, a rotating drum carrying a marking projection which establishes a printing point that travels transversely of said paper tape on one side thereof, a printing bar on the opposite side of said paper tape adapted to be actuated toward said marking projection for coacting therewith in making a printed mark on said tape, a standard meter, means responsive to said standard meter for governing said rotating cylinder, means for projecting a light beam through the conventional anti-creep hole or holes in the disk of the meter being tested, means responsive to said light beam for governing said printing bar, and variable speed means operative between said standard meter and said rotating drum for adjusting the speed of said drum relatively to the speed of said standard meter corresponding to different load conditions at which the watthour meter is to be checked.

8. In a watthour meter comparator, the combination of a standard meter, means responsive to the rotation of said standard meter for generating an alternating current, a synchronous motor operated by said alternating current, a rotating drum driven by said synchronous motor, a spiral marking ridge on said drum, a printing bar actuatable toward said spiral marking ridge to make a printed record on a paper tape therebetween, and means responsive to the rotation of the watthour meter to be tested for actuating said printing bar, said latter means comprising aperture means in the disk of the meter being tested, means for projecting a light beam through said aperture means, and means responsive to said light beam for actuating said printing bar, said aperture means permitting passage of said light beam not more than twice in each revolution of said disk.

9. In a watthour meter comparator, the combination of a standard meter, means responsive to the rotation of said standard meter for generating an alternating current, a plurality of synchronous motors adapted to be energized by said alternating current, a rotatable drum adapted to be driven by one of said synchronous motors, a spiral marking ridge on said drum, a printing bar actuatable toward said spiral marking ridge to make a printed record on a paper tape therebetween, means responsive to the rotation of the watthour meter to be tested for actuating said printing bar, and means enabling said rotating drum to be driven selectively by one or another of said synchronous motors, whereby said drum can be driven at different speeds relatively to the speed of said standard meter corresponding to different load conditions of the watthour meter under test, so that the same comparator can successively perform full load testing and light load testing in one complete testing operation on each meter.

10. In a watthour meter comparator, the combination of a standard meter, means responsive to the rotation of said meter for generating an alternating current of a frequency proportional to the rotative speed of said standard, a first synchronous motor adapted to be operated by said alternating current, a second synchronous motor adapted to be operated by said alternating current, a rotatable drum adapted to be driven by one or the other of said synchronous motors, a spiral marking ridge on said drum, a printing bar actuatable toward said spiral marking ridge to make a printed record on a paper tape therebetween, and means responsive to the rotation of the watthour meter to be tested for actuating said printing bar, said two synchronous motors having different number of stator poles for enabling said drum to be driven at different speeds relatively to the speed of said standard meter corresponding to different loads on the watthour meter to be tested, so that the same comparator can perform full load testing and light load testing in one complete testing operation on each meter.

11. In a watthour meter comparator, the combination of a standard meter, means responsive to the rotation of said meter for generating an alternating current of a frequency proportional to the rotative speed of said standard, a first synchronous motor adapted to be operated by said alternating current, a second synchronous motor adapted to be operated by said alternating current, a rotatable drum adapted to be driven by one or the other of said synchronous motors, a spiral marking ridge on said drum, a printing bar actuatable toward said spiral marking ridge to make a printed record on a paper tape therebetween, means responsive to the rotation of the watthour meter to be tested for actuating said printing bar, and speed reducing drive means arranged for driving said drum at a reduced speed relatively to the speed of said standard meter when driven by said second synchronous motor, so that the same comparator can perform full load testing and light load testing in one complete testing operation on each meter.

12. In apparatus for comparing the relative motions of two devices, the combination of a record medium, a rotating printing member carrying a marking projection through a predetermined path of travel relatively to said record medium, a reciprocable printing member adapted to be actuated toward said marking projection for making a printed impression on said record medium, apertures in one of said devices, means for transmitting light through said apertures, photoelectric means responsive to the light transmitted through said apertures for governing one of said printing members, and means responsive to the motion of the other of said devices for governing the other of said printing members.

13. In an apparatus for comparing the relative rotative speeds of two rotating devices, the combination of a record tape, a rotating member carrying a marking projection which establishes a printing point that travels transversely of said record tape on one side thereof, a reciprocating member on the opposite side of said record tape adapted to be actuated toward said marking projection for making a printed mark on said tape, light transmitting apertures in each of said devices, means for transmitting light therethrough, photoelectric means responsive to the light transmitted through the apertures of one of said devices for governing the rotative speed of said rotating member, and photoelectric means responsive to the light transmitted through the apertures of the other of said devices for governing the reciprocation of said reciprocating member.

14. In a watthour meter comparator, the combination of a standard meter relatively to which the meter to be tested is compared, said standard meter comprising a source of light, a photoelectric cell responsive thereto, a rotating member having a predetermined rate of rotation established by the standard meter, light transmitting apertures in said rotating member for causing the light to be transmitted from said source to said cell in pulses having a relatively high frequency dependent upon the rotative speed of said standard meter, electric motor means operated by the pulse frequency derived from said cell, a marking drum driven by said electric motor means, a spiral marking projection on said drum, a printing bar actuatable toward said marking projection to make a printed record on the record medium therebetween, and means responsive to the meter to be tested for actuating said printing bar at a relatively low periodicity dependent upon the operating speed of said latter meter.

15. In a watthour meter comparator, the combination of a standard meter relatively to which the meter to be tested is compared, a source of light, a photoelectric cell adapted to respond thereto, said standard meter comprising a rotating disk having a plurality of angularly spaced apertures therein for transmitting light from said source to said photocell, whereby the rotation of said disk alternately transmits and interrupts the transmission of light from said source to said photoelectric cell at a frequency dependent upon the rotative rate of said standard meter, an amplifier receiving the resulting pulses from said photoelectric cell, a synchronous motor driven by the output from said amplifier, a marking drum driven by said synchronous motor, a spiral marking ridge on said drum, a printing bar adapted to be actuated toward said spiral ridge for making a printed impression upon a paper tape therebetween, a second source of light and a second photoelectric cell associated with the meter to be tested, said latter meter having a rotating disk provided with an anti-creep aperture for interrupting the light beam transmitted from said second source of light to said second photoelectric cell, an amplifier receiving the resulting pulses from said second photoelectric cell, and means responsive to the output from said latter amplifier for actuating said printing bar.

16. In an apparatus for comparing the relative rotative speeds of two rotating devices, the combination of a record tape, a rotating drum carrying a marking projection which establishes a printing point that travels transversely of said record tape on one side thereof, a printing bar on the opposite side of said record tape adapted to be actuated toward said marking projection for coacting therewith and making a printed mark on said tape, means responsive to the transmission of light through apertures in one of said devices for governing the rotative speed of said drum, means responsive to the transmission of light through apertures in the other of said devices for governing the operation of said printing bar, and means for making a preliminary relatively coarse comparison between the rotative speeds of the two devices so as to disclose the possibility of errors which might be multiples of drum rotation.

17. In a watthour meter comparator, the combination of a standard meter, a paper tape, a rotating drum carrying a marking projection which establishes a printing point that travels transversely of said paper tape on one side thereof, a printing bar on the opposite side of said paper tape adapted to be actuated toward said marking projection for coacting therewith in making a printed mark on said tape, means responsive to the transmission of light through apertures in the disk of said standard meter for causing said rotating drum to be driven at a proportional speed, means responsive to the transmission of light through apertures in the disk of the watthour meter to be checked for causing said printing bar to be actuated at a relatively low periodicity dependent upon the operating speed of said latter meter, and stroboscopic means for making a preliminary comparison between the rotative speeds of the two meters so as to establish that their speeds are sufficiently close together to make an accurate speed comparison record on said paper tape.

18. In a watthour meter comparator, the combination of a standard meter, means responsive to the rotation of said meter for generating an alternating current of a frequency proportional to the rotative speed of said standard, a first synchronous motor adapted to be operated by said alternating current, a second synchronous motor adapted to be operated by said alternating current, a rotatable drum adapted to be driven successively by one and then the other of said synchronous motors in the performance of a complete testing operation, a spiral marking ridge on said drum, a printing bar actuatable toward said spiral marking ridge to make a printed record on a paper tape therebetween, means responsive to the rotation of the watthour meter to be tested for actuating said printing bar, speed reduction gearing for driving said drum at a reduced speed when driven by said second synchronous motor, and centrifugally responsive clutch means for uncoupling said second synchronous motor from said drum when said drum is being driven by said first synchronous motor.

19. In a watthour meter comparator, the combination of a standard meter, means responsive to the rotation of said meter for generating an alternating current of a frequency proportional to the rotative speed of said standard, a first synchronous motor adapted to be operated by said alternating current for full-load testing, a second synchronous motor adapted to be operated by said alternating current for light load testing, said second synchronous motor having a larger number of stator poles than said first motor for running at a lower speed than said first motor on the same frequency, a rotatable drum adapted to be driven successively by the rotor of the first motor for full-load testing and by the rotor of the second motor for light load testing in the performance of a complete testing operation, a spiral marking ridge on said rotatable drum, a printing bar actuatable toward said spiral marking ridge to make a printed record on a marking tape therebetween, and means responsive to the rotation of the watthour meter to be tested for actuating said printing bar.

20. In apparatus for making full-load and light-load comparative tests between a standard watthour meter and a watthour meter to be tested, wherein each meter comprises a potential coil, a current coil and a rotary element driven thereby, the combination therewith of generating means responsive to the rotary element of said standard meter for generating an alternating current having a frequency proportional to the speed of said rotary element, a full-load synchronous motor and a light-load synchronous motor adapted to be energized selectively by said alternating current, a rotary drum adapted to be driven either by said full-load motor or said light-load motor, a spiral marking ridge on said drum, a printing bar adapted to be actuated toward said marking ridge to make a printed impression on a record medium therebetween, means responsive to the meter to be tested for actuating said printing bar, and change-over mechanism for changing the apparatus over from full-load testing to light-load testing or vice versa, said change-over mechanism comprising means operative to connect said generating means selectively either to said full-load motor or to said light-load motor, and means operative to connect the current coil of the meter being tested selectively either to a full-load source of current or to a light-load source of current.

21. In apparatus for making full-load and light-load comparative tests between a standard watthour meter and a watthour meter to be tested, wherein each meter comprises a potential coil, a current coil and a rotary element driven thereby, the combination therewith of generating means responsive to the rotary element of said standard meter for generating an alternating current having a frequency proportional to the speed of said rotary element, a full-load synchronous motor and a light-load synchronous motor adapted to be energized selectively by said alternating current, a rotary drum adapted to be driven either by said full-load motor or said light-load motor, a spiral marking ridge on said drum, a printing bar adapted to be actuated toward said marking ridge to make a printed impression on a record medium therebetween, means responsive to the meter to be tested for actuating said printing bar, an energizing load circuit operatively connected with the potential coils and the current coils of both meters during full-load testing, and change-over mechanism for changing the apparatus over from full-load testing to light-load testing comprising a current transformer adapted to be energized by said energizing load circuit for producing a light-load current output proportional to the light-load rate to be tested, switch contacts operative to connect said generating means to said light-load motor, and switch contacts operative to connect the secondary of said current transformer to the current coil of the meter to be tested.

References Cited in the file of this patent

UNITED STATES PATENTS

| Number | Name | Date |
|---|---|---|
| 1,857,593 | Hill | May 10, 1932 |
| 1,878,658 | Aronoff | Sept. 20, 1932 |
| 1,967,072 | Young | July 17, 1934 |
| 2,466,804 | Giffen et al. | Apr. 12, 1949 |
| 2,557,314 | Robinson et al. | June 19, 1951 |